US011697503B2

(12) United States Patent
Wells

(10) Patent No.: US 11,697,503 B2
(45) Date of Patent: Jul. 11, 2023

(54) PRESSURE REGULATING VALVE ASSEMBLY

(71) Applicant: Rolls-Royce Deutschland Ltd & Co KG, Blankenfelde-Mahlow (DE)

(72) Inventor: Paul Julian Wells, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 51 days.

(21) Appl. No.: 17/498,470

(22) Filed: Oct. 11, 2021

(65) Prior Publication Data
US 2022/0127005 A1    Apr. 28, 2022

(30) Foreign Application Priority Data

Oct. 22, 2020  (DE) ..................... 10 2020 127 834.9

(51) Int. Cl.
| | |
|---|---|
| *B64D 15/04* | (2006.01) |
| *B64D 33/02* | (2006.01) |
| *F01D 17/14* | (2006.01) |
| *F01D 25/02* | (2006.01) |
| *F01D 25/24* | (2006.01) |

(Continued)

(52) U.S. Cl.
CPC ............. *B64D 15/04* (2013.01); *B64D 33/02* (2013.01); *F01D 17/141* (2013.01); *F01D 25/02* (2013.01); *F01D 25/24* (2013.01); *F02C 7/047* (2013.01); *F16K 17/02* (2013.01); *B64D 2033/0233* (2013.01); *F05D 2220/323* (2013.01)

(58) Field of Classification Search
CPC .......... F02C 7/047; F02C 7/057; B64D 15/04; B64D 33/02; F01D 17/141; F01D 25/02; F01D 25/24; F16K 17/02
See application file for complete search history.

(56) References Cited

U.S. PATENT DOCUMENTS

| | | | | |
|---|---|---|---|---|
| 4,320,872 A | * | 3/1982 | Frederick ............... | B64D 15/04 236/80 C |
| 11,545,676 B2 | * | 1/2023 | Piesker .................. | B64D 15/04 |

(Continued)

OTHER PUBLICATIONS

German Search Report dated Jun. 28, 2021 from counterpart German Patent Application No. DE 102020127834.9.

(Continued)

*Primary Examiner* — Craig Kim
(74) *Attorney, Agent, or Firm* — Shuttleworth & Ingersoll, PLC; Timothy J. Klima

(57) ABSTRACT

A pressure regulating valve assembly includes: a valve having an upstream side receiving an input flow and a downstream side providing an output flow, an actuator for opening and closing the valve, including partially opening the valve, and a regulator controlling the actuator to open, close or partially open the valve. The regulator includes a sense pressure port, wherein pressure at the port is maintained constant by the regulator. A chamber has a first entry orifice, a second entry orifice and an exit orifice. The first entry orifice is connected to the upstream side, the second entry orifice is connected to the downstream side, and the exit orifice is connected to the port. The exit orifice provides that the pressure at the exit orifice lies between the pressure at the first entry orifice and the pressure at the second entry orifice.

15 Claims, 6 Drawing Sheets

(51) Int. Cl.
*F02C 7/047* (2006.01)
*F16K 17/02* (2006.01)

(56) References Cited

U.S. PATENT DOCUMENTS

| | | |
|---|---|---|
| 2005/0276685 A1 | 12/2005 | Wiggins et al. |
| 2014/0090719 A1* | 4/2014 | Mevius ..................... F16K 1/42 |
| | | 137/505.18 |
| 2016/0357197 A1* | 12/2016 | Pena .................. G05D 16/0636 |
| 2017/0334566 A1* | 11/2017 | Goodman .............. B64D 33/02 |
| 2022/0127005 A1* | 4/2022 | Wells ...................... F02C 7/047 |
| 2022/0315227 A1* | 10/2022 | Mezzino ............... F16K 31/363 |

OTHER PUBLICATIONS

European Search Report dated Mar. 7, 2022 from counterpart European Patent Application No. EP 21 20 0655.

* cited by examiner

PRESSURE REGULATING VALVE ASSEMBLY

This application claims priority to German Patent Application DE102020127834.9 filed Oct. 22, 2020, the entirety of which is incorporated by reference herein.

The present disclosure relates to a pressure regulating valve assembly.

Pneumatic pressure regulating valves are well known in the art. Such valves provide for a constant pressure at the valve downstream side. When used for regulating the pressure of bleed air in an anti-ice system in a gas turbine engine, a disadvantage associated with such valves lies in that the part to be heated may experience unacceptable high temperatures due to the fact that the valve addresses an increased pressure at the valve upstream side by regulating the valve downstream pressure to a constant set value, but does not address the increase in temperature associated with an increased pressure.

For example, in an anti-ice system for heating the intake lip of a nacelle of a gas turbine engine with bleed air, the system can overheat the intake lip when it is switched on at a time when there is no ice to be melt at the intake lip.

The problem underlying the present invention is to provide for a pressure regulating valve assembly which may be used in an anti-ice system of a gas turbine engine that avoids high structural temperatures in such system.

The invention provides for a pressure regulating valve assembly and a gas turbine engine with features as disclosed herein. Embodiments of the invention are also identified herein.

According to an aspect of the invention, a pressure regulating valve assembly is provided that comprises a valve having an upstream side receiving an input flow and a downstream side providing an output flow. The valve assembly further comprises actuating means for opening and closing the valve, including partially opening the valve, and regulating means controlling the actuating means to open or close the valve or to partially open the valve, wherein the regulating means comprise a sense pressure port. The regulating means are configured such that the pressure present at the sense pressure port is maintained constant by the regulating means.

It is further provided a chamber having a first entry orifice, a second entry orifice and an exit orifice, wherein the first entry orifice is connected to the valve upstream side, the second entry orifice is connected to the valve downstream side, and the exit orifice is connected to the sense pressure port. The exit orifice is provided such that the pressure present at the exit orifice which is applied to the sense pressure port lies between the pressure at the first entry orifice (which depends on the pressure at the valve upstream side) and the pressure at the second entry orifice (which depends on the pressure at the valve) downstream side.

Aspects of the invention are thus based on the idea to provide the sense pressure port with a pressure which is a function of the pressure at the first entry orifice and the pressure at the second entry orifice (which depend on the pressure at the valve upstream side and the pressure at the valve downstream side) and which lies between these pressures. Accordingly, the pressure applied to the sense pressure port is lower than the pressure at the second entry orifice which depends on the pressure at the valve downstream side. As the regulating means maintain constant the pressure present at the sense pressure port, this implies that, if the pressure at the valve upstream side increases, the pressure at the valve downstream side decreases.

Accordingly, an increase in pressure at the valve upstream side, which goes along with an increase in temperature of the fluid flowing through the valve, leads to a reduced pressure at the valve downstream side, thereby compensating the increase in temperature in the sense that the mass flow through the valve is reduced. Thereby, overheating, e.g., of an intake lip that is to be heated by bleed air passing the pressure regulating valve assembly can be prevented as an increased pressure and temperature of the bleed air upstream of the valve is counterbalanced by a reduced downstream pressure and a reduced mass flow downstream of the valve that acts on the intake lip.

Another advantage associated with the invention lies in that such pneumatic valve assembly allows use of higher stage bleed air.

As to terminology, it is pointed out that the pressure at the valve upstream side is also referred to as the upstream pressure or supply pressure. The pressure at the valve downstream side is also referred to as downstream pressure.

The use of the valve assembly in an anti-ice system is to be understood as exemplary only. The valve assembly may be used in any environment in which it desired to counterbalance an increased supply pressure with a reduced mass flow.

Generally, the pressure at the exit orifice of the chamber is a function of the upstream pressure and the downstream pressure. By choosing an appropriate size of the first entry orifice and of the second entry orifice a desired reduction of the valve downstream pressure when the supply pressure increases can be set. In an embodiment, the first entry orifice has a different size than the second entry orifice. Alternatively, the first entry orifice has the same size as the second entry orifice.

In an embodiment, the first entry orifice is connected to the valve upstream side through an adjustment valve. In one variant of this embodiment, the adjustment valve is configured to allow to control the pressure at the first entry orifice, thereby also controlling the pressure at the chamber exit orifice. This provides the ability to preset the operating point by manual adjustment of the decrease in downstream pressure, or the ability to allow active control of the pressure drop to adjust the operation based on an additional control parameter, such as aircraft attitude.

In another variant of this embodiment, the adjustment valve is configured to limit a set upper value of the pressure at the first entry orifice. In this variant, the adjustment valve may be a pressure-relief valve such as a spring-loaded ball or a poppet valve. The adjustment valve opens if the pressure exceeds the set upper value. The set upper value is set such that it lies below the pressure at which the second entry orifice would choke during operation, thereby avoiding a scenario in which the valve would close.

In embodiments, the first entry orifice is connected by a first duct to the valve upstream side and/or the second entry orifice is connected by a second duct to the valve downstream side and/or the exit orifice is connected by a third duct to the sense pressure port. The respective connections by means of ducts, however, represent an embodiment only. For example, alternatively, the chamber could be directly fixed to the valve body, wherein the connection to the first entry orifice and the second entry orifice is made by respective holes in the valve body.

In an embodiment, the actuating means comprise a first chamber and a second chamber separated by an actuator diaphragm and movable relative to each other, wherein the regulating means are configured to control the pressure of the first chamber, wherein the pressure of the first chamber determines the position of the second chamber and the opening degree of the valve. Accordingly, by controlling the pressure of the first chamber, the opening degree of the valve is set. As discussed before, the regulating means are configured such that the pressure at the sense pressure port is controlled to be constant.

In an embodiment, the second chamber is coupled by means of an actuating lever to a rotating flap or other adjustable closing element, the position of which controls the opening degree of the valve, wherein the position of the rotating flap or other adjustable closing element is determined by the position of the second chamber.

It may be provided that the regulating means comprise a spring loaded diaphragm separating a first chamber and a second chamber, wherein the sense pressure port is coupled to the first chamber. The assembly is configured such that when the pressure at the sense pressure port is above a set pressure point, the pressure moves the spring loaded diaphragm against the force of the spring, thereby causing a valve to open. Such opening of the valve causes the first chamber of the actuator means to depressurize. On the other hand, when the pressure at the sense pressure port is below the set pressure point again, the valve which causes the first chamber to depressurize is closed again. Accordingly, the valve takes an equilibrium position at which the sense pressure port stays at the set point pressure, wherein the set point pressure is determined by the spring force of the spring loaded diaphragm.

The assembly may comprise a switch for switching the valve assembly on and off. In an embodiment, such switch may be provided for by a solenoid, wherein the solenoid assembly is configured to connect or disconnect the first chamber of the actuator assembly to a high pressure source.

In a further aspect, the present invention regards a gas turbine engine for an aircraft which comprises:
 an engine core comprising a turbine, a compressor, and a core shaft connecting the turbine to the compressor.
 a nacelle having an intake lip,
 an anti-ice system that provides bleed air from the compressor to the nacelle intake lip for heating the intake lip, and
 a pressure regulating valve assembly as disclosed herein which is configured to regulate the amount of bleed air provided to the intake lip.

In an embodiment, the gas turbine further comprises a fan located upstream of the engine core, and a planetary gearbox that receives an input from the core shaft and outputs drive to the fan so as to drive the fan at a lower rotational speed than the core shaft. In an embodiment, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

The invention will be explained in more detail on the basis of exemplary embodiments with reference to the accompanying drawings in which.

Figure 1:
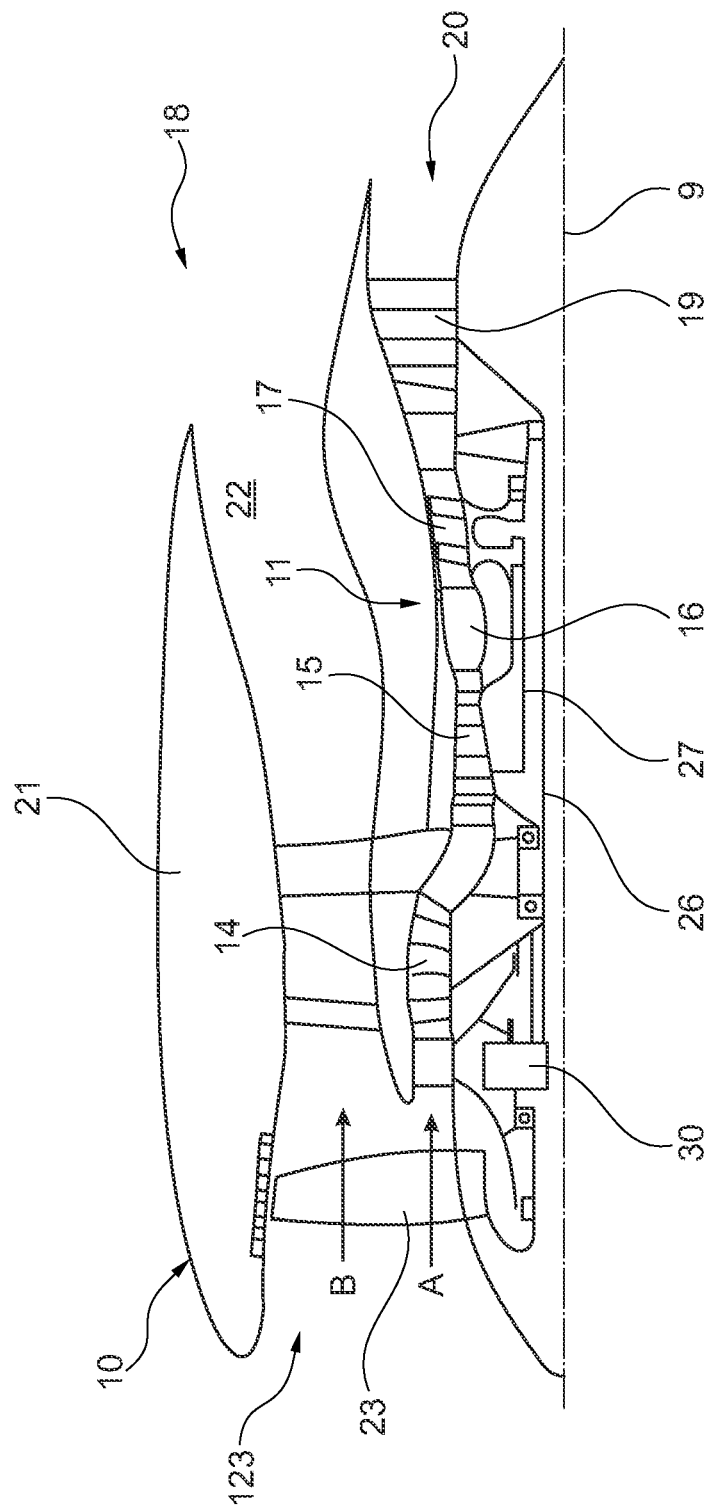
FIG. 1 is a simplified schematic sectional view of a gas turbine engine in which the present invention can be realized.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In a gas turbine engine 10 as discussed with respect to FIG. 1, or in any other gas turbine engine, an anti-ice system may be implemented to provide heating of particular areas of the gas turbine engine.

Figure 2:
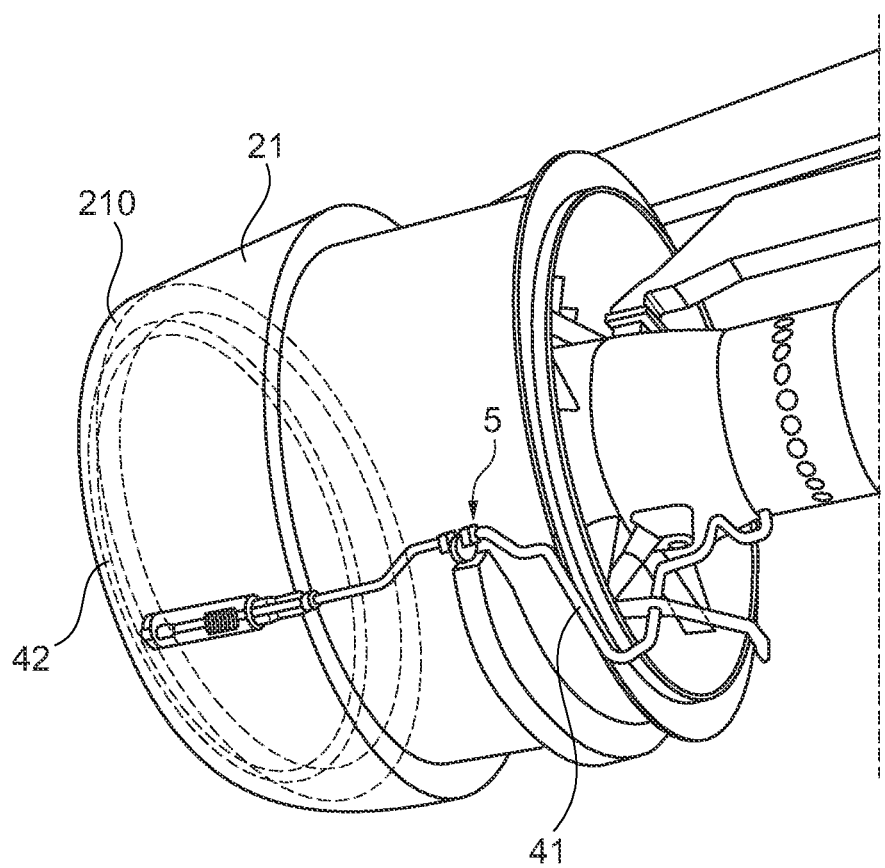
FIG. 2 is a schematic perspective view of an anti-ice system providing bleed air from a compressor stage of a gas turbine engine to a ring pipe located at the intake lip of a nacelle, wherein the bleed air is provided through a duct to which comprises a pressure regulating valve assembly.

More particularly, in particular when an aircraft flies through air with high humidity and a temperature around the freezing point, moisture may accumulate on specific surfaces as ice. One such surface is the intake lip formed at the upstream end of the gas turbine engine nacelle. To avoid the buildup of ice, warm air is supplied to the intake lip. FIG. 2 shows schematically an anti-ice system providing such warm air.

The anti-ice system comprises a duct 41 which is installed to guide bleed air extracted from one or several compressor stages. The compressor stage or stages for bleed air supply are selected in such a way that the warm air has a desired temperature level for the anti-ice system during engine operation. The bleed air is supplied to a pressure control valve assembly 5 that will be discussed in detail with respect to FIGS. 3 to 6. The pressure control valve assembly 5 may include a shut off valve that allows to activate and deactivate the anti-ice system.

From the pressure control valve assembly 5, bleed air is fed into a pipe 42 installed at the inlet lip 210. Warm air circulates in the pipe 42 and heats the intake lip 210. Different embodiments may be implemented in this respect. For example, the pipe 42 may be configured as a spray tube spraying through holes warm air against the wall of the intake lip. In another embodiment, a separate pipe 42 is not provided for and, instead, warm air is circulated directly in chambers implemented at the intake lip.

As is well known to those skilled in the art, the distribution of bleed air may comprise the distribution for other functions as well. For example, bleed air may be distributed to other parts of the gas engine turbine for cooling purposes and to an air conditioning system of an aircraft cabin. Accordingly, the anti-ice system of FIG. 2 may be part of a more complex bleed air distribution system.

The pressure control valve assembly has the function to regulate the bleed air pressure in a desired manner.

Figure 3:
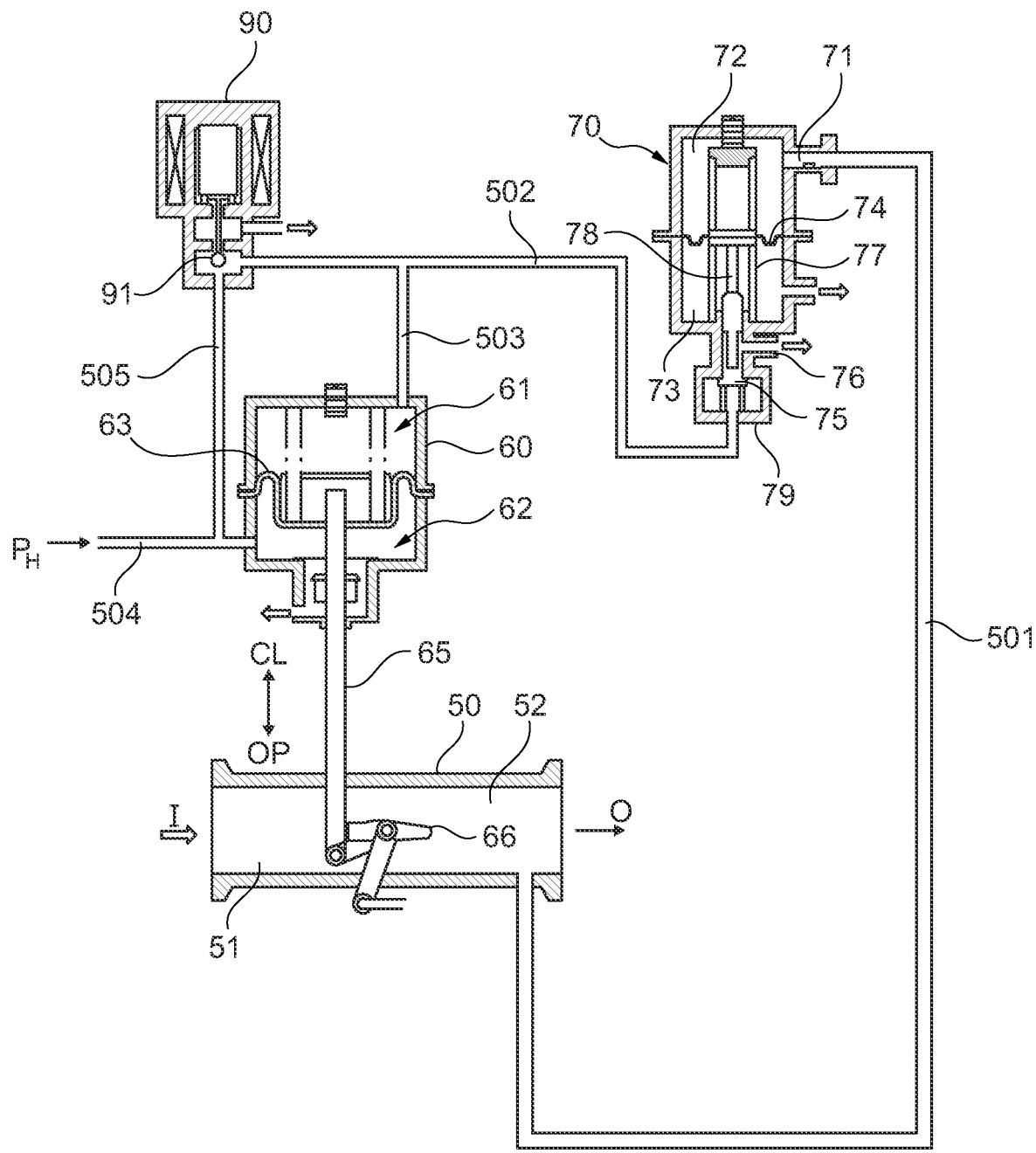
FIG. 3 is an example of a pressure regulating valve assembly not constructed in accordance with the principles of the present invention.

FIG. 3 is an example of a pressure control valve assembly that regulates the downstream pressure of the control valve to a set point such as, e.g., 25 psi. The example of FIG. 3 is not in accordance with the principles of the present invention but helpful to understand the background of the invention.

According to FIG. 3, the pressure control valve assembly comprises as the main components a valve 50, an actuating device 60, and a regulating device 70.

The valve 50 has an upstream side 51 which receives an input flow I and a downstream side 52 which provides an output flow O. The input flow I has an upstream or supply pressure at the upstream side 51 of the valve 50 and the output flow O has a downstream or regulation pressure at the downstream side 52 of the valve 50. In the valve assembly of FIG. 3, the downstream pressure is regulated to a constant value.

The actuating device 60 comprises a first chamber 61 and a second chamber 62 which are movable relative to another. The two chambers 61, 62 are separated by an actuator diaphragm 63. The actuating device 60 further comprises an actuating lever 65. One end of the actuating lever 65 is connected to the second chamber 62 and the other end the actuating lever 65 is connected to a rotating flap 66 or other device which is located in the flow path of the valve 50. Depending on the position of the rotating flap 66, the flow path through the valve 50 is blocked, partly open or fully open. To change between different opening degrees of the valve 50, the actuating lever 65 is moved vertically between an upper position in which the valve 50 is fully closed and a lower position in which the valve 50 is fully opened. The actuating lever 65 can take intermediate positions in which the valve 50 is partly open.

The regulating device 70 comprises a first chamber 72 and a second chamber 73 which are separated by a spring biased diaphragm 74, wherein a spring 77 is biasing the diaphragm 74. The regulating device 70 further comprises a sense pressure port 71 as input port. The sense pressure port 71 is connected to the first chamber 72 such that the pressure at the sense pressure port 71 acts against the diaphragm 74.

The regulating device 70 further comprises a piston 78 coupled to the diaphragm 74 and a valve 75, wherein the position of the piston 78 determines if the valve 75 is opened or closed. If the valve 75 is opened, vent air can pass the valve 75 and exit through an opening 76.

As a further component of the assembly is provided a solenoid assembly 90 which serves to switch the valve assembly on and off. The solenoid assembly 90 switches the position of a ball 91 between a position in which the ball 91 closes a duct 501 which is supplied with high pressure air PH and a position in which the duct 501 is in fluid connection with a further duct 502, wherein the further duct 502 is connected through a duct 503 to the first chamber 61 of the actuating device 60 and also connected to the regulating device 60.

Other fluid connections are as follows. The downstream side 52 of the valve 50 is connected through a duct 501 to the sense pressure port 71 of the regulating device such that the (static) downstream pressure of the valve 50 is the inlet pressure of the regulating device 70. Further, a chamber 79 of the regulating device 70 which is closed or opened by the valve 75 is connected through the duct 502 to the solenoid assembly 90 and also to duct 503 and thus the first chamber 61 of the actuating device.

The function of the pressure regulating valve assembly is as follows. When the pressure regulating valve assembly is switched on by the solenoid assembly 90, ball 91 is in the position depicted in FIG. 3 such that high-pressure air $P_H$ is applied through duct 504 to the second chamber 62 of the actuating device 60 and through ducts 505, 502, 503 to the first chamber 61 of the actuating device 60. To the contrary, when the pressure regulating valve assembly is switched off, high-pressure air is supplied to the second chamber 62 only such that the pressure acting on the diaphragm 63 pushes the second chamber and the actuating lever 65 up to completely close the valve 50.

In the regulating device 70, when the pressure in the first chamber 72 acting on the diaphragm 74 exceeds the pressure that the spring 77 exercises on the diaphragm 74, the piston 78 is lowered which causes the valve 75 to open. When valve 75 opens, the first chamber 61 of the actuating device 60 is depressurized by air in the first chamber 61 exiting through ducts 503, 502, chamber 79 and opening 76. Such depressurizing of the first chamber 61 of the actuating device 60 causes the first chamber 62 and the actuating lever 65 to move upwards, thereby further closing the valve 50.

By further closing the valve 50, the pressure drop over the valve 50 is increased and the outlet pressure at the downstream side 52 is decreased. As the downstream pressure is connected through duct 502 to the sense pressure port 71, such decrease in downstream pressure reduces the pressure in the first chamber 72 of the regulating device 70, wherein the valve 75 is closed again when the pressure in the first chamber 72 is below the pressure exercised by the spring 77 on the diaphragm 74.

The rotating flap 66 is thus controlled to take an equilibrium position in which the pressure at the downstream side 52 of valve 50 is equal to a set point pressure. In other words, the pressure regulating valve assembly controls the pressure at the downstream side 52 of valve 50 to be at a constant value, wherein the constant value is determined by the force of spring 77.

Figure 4:
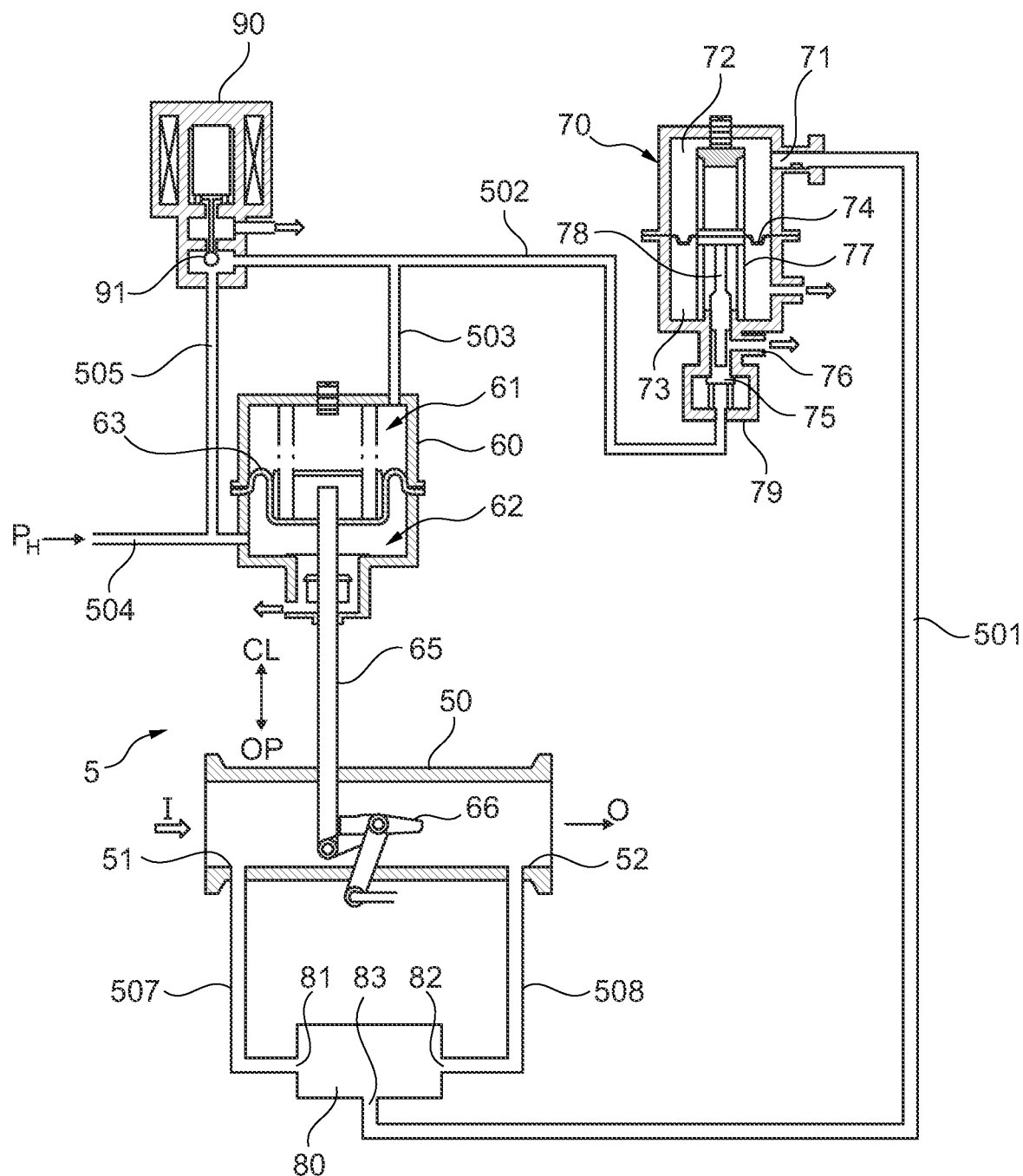
FIG. 4 is a first embodiment of a pressure regulating valve assembly, the pressure regulating valve assembly comprising a chamber having two entry orifices connected to the upstream side and the downstream side of the valve and having an exit orifice that defines the pressure to be regulated by the assembly.

FIG. 4 shows a first embodiment of the pressure regulating valve assembly 5. The pressure regulating valve assembly 5 comprises a valve 50, and actuating device 60 and a regulating device 70 as described with respect to FIG. 3. Regarding these components, it is referred to the description of FIG. 3.

In addition, the pressure regulating valve assembly 5 comprises a chamber 80 which has a first entry orifice 81, a second entry orifice 82 and an exit orifice 83. The first entry orifice 81 is connected via a duct 507 to the upstream side 51 of valve 50. The second entry orifice 82 is connected via a duct 508 to the downstream side 52 of valve 50. Further, the exit orifice 83 of chamber 80 is connected via duct 501 to the sense pressure port 71 of the regulating device 6.

Accordingly, a pressure is provided to the sense pressure port 71 which lies between the pressure at the first entry orifice 81 (which depends on the (static) pressure at the valve upstream side 51) and the pressure at the second entry orifice 82 (which depends on the (static) pressure at the valve downstream side 52). In this arrangement, the equilibrium position of the valve 50 respectively the rotating flap 66 will be sought again. However, in the embodiment of FIG. 4, this equilibrium position is determined by the chamber pressure at the exit orifice 83 as this pressure is supplied to the sense pressure port 71 of the regulating device 70.

However, the chamber pressure at the exit orifice 83 is a function of the upstream pressure and the downstream pressure. When the upstream pressure at the upstream side 51 and thus at the first entry orifice 81 increases, the downstream pressure at the downstream side 52 and the second entry orifice 82 must decrease. This becomes clear when first assuming that duct 507 is blocked. Then, the situation is identical as in FIG. 3. For example, the downstream pressure is regulated to 25 psi as a set point pressure. When now assuming that duct 507 is opened just a little bit such that a pressure of 1 psi is present at the first entry orifice 81, and further considering that the pressure at the exit orifice 83 is regulated to 25 psi, the downstream pressure is reduced to 24 psi.

The following is a general rule that follows from the construction of chamber 80. When the supply pressure increases, the downstream pressure decreases, thereby reducing the mass flow through the valve 50. This allows to counterbalance the effects of an increased temperature that goes along with an increased supply pressure.

Figure 6:
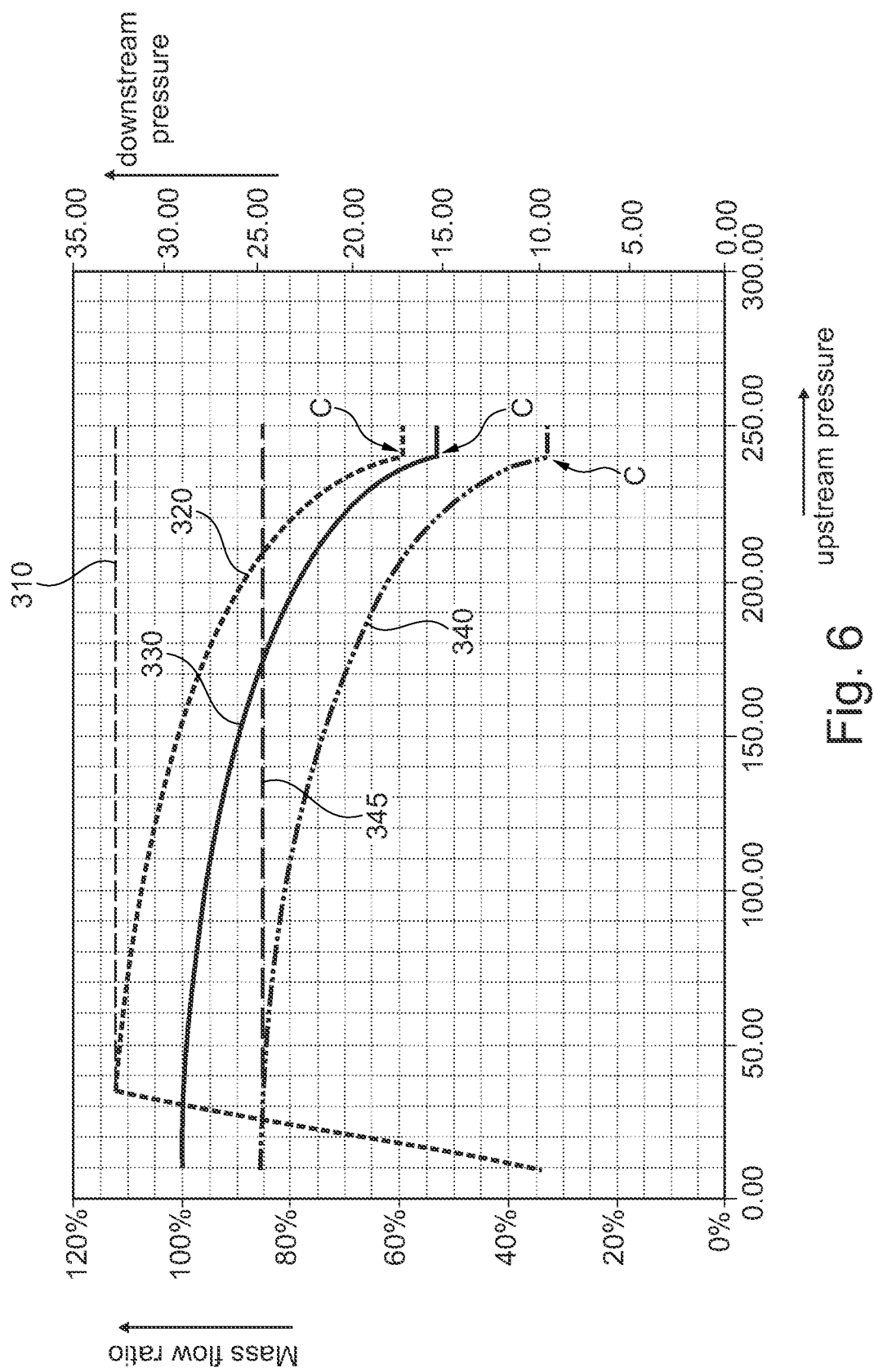
FIG. 6 is a diagram showing several curves that illustrate the principles of the present invention.

This relationship is further shown in the diagram of FIG. 6. FIG. 6 shows a first curve 310 which depicts the gauge pressure (y-axis at right hand side of diagram) dependent on the upstream/supply pressure (x-axis) for a conventional valve assembly such as shown in FIG. 3. A second curve 320 depicts the gauge pressure (y-axis at right hand side of diagram) dependent on the upstream/supply pressure (x-axis) for a valve assembly in accordance with FIG. 4. A third curve 330 depicts the ratio of mass flow in a conventional valve assembly such as shown in FIG. 3 to the mass flow in the valve assembly in accordance with FIG. 4 (y-axis at left hand side of diagram) dependent on the upstream/supply pressure (x-axis). A fourth curve 340 depicts the downstream regulation pressure of the valve assembly in accordance with FIG. 4 (y-axis at right hand side of diagram) dependent on the upstream/supply pressure (x-axis). A fifth curve 345 depicts the downstream regulation pressure for a conventional valve assembly such as shown in FIG. 3 (y-axis at right hand side of diagram) dependent on the upstream/supply pressure (x-axis).

To start with the fifth curve 345, the downstream regulation pressure is constant (25 psi in the depicted example) with a conventional valve assembly. To the contrary, according to the fourth curve 340, the downstream regulation pressure decreases as the upstream pressure increases. At the same time, according to the third curve 330, also the mass flow ratio decreases as the upstream pressure increases. The first curve 310 and the second curve 320 show the downstream gauge pressure for a conventional valve assembly (curve 310) and for a valve assembly in accordance with the present invention (curve 320). In curve 320, the downstream gauge pressure also decreases as the upstream pressure increases.

The curves show that, when the supply pressure increases, the downstream pressure and the mass flow through the valve 50 decrease with the valve assembly of FIG. 4.

The curves further show that it is possible for the second entry orifice 82 to choke, see arrows C. When this happens the pressure in the assembly will rise above the set point and the valve will completely close. This can either be set to be outside the range of desired operation, or mitigated by the valve allowing some leakage in the closed position, sized to provide adequate performance.

It is pointed out that by the relative sizes of the first entry orifice 81 and the second entry orifice 82 the pressure at the exit orifice 83 and thus the pressure drop over valve 50 is determined. The first entry orifice 81 and the second entry orifice 82 may be chosen to have a different or the same size.

Figure 5:
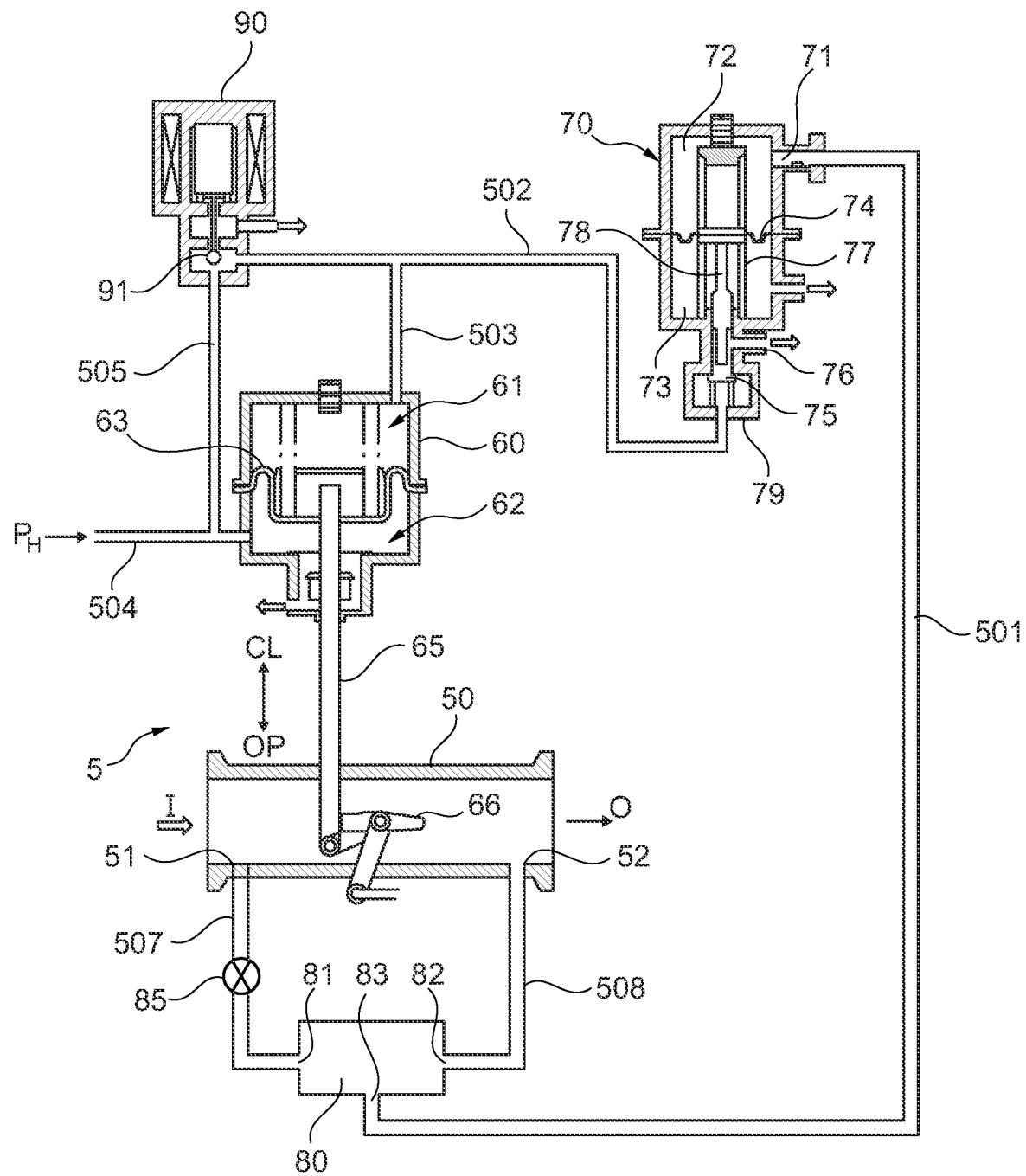
FIG. 5 is a second embodiment of a pressure regulating valve assembly, wherein an additional adjustment valve is provided between the upstream side of the valve and the corresponding entry orifice of the chamber.

FIG. 5 shows a further embodiment which differs from the embodiment of FIG. 4 in that an adjustment valve 85 is included upstream of the first entry orifice in duct 507. A plurality of options exist of how such adjustment valve 85 is implemented in use.

In one embodiment, the adjustment valve 85 is configured to control the pressure at the first entry orifice 81. For example, the pressure may be manually adjusted, thereby pre-setting the operating point and adjusting the decrease in the downstream pressure when the supply pressure increases. In another example, active control of the adjustment valve 85 and thus of the pressure drop over the valve 50 is allowed to adjust the operation of the assembly based on one or several additional control parameters such as aircraft attitude.

In another embodiment, the adjustment valve 85 could be used as a pressure-relief valve. It could be, e.g., a spring-loaded ball or puppet that opens to the surrounding if the pressure in duct 507 exceeds a set upper value. Preferably, this upper value is below the pressure at which the second entry orifice 82 would choke, thereby avoiding a scenario in which the valve 50 completely closes.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A pressure regulating valve assembly comprising:
a valve having an upstream side receiving an input flow and a downstream side providing an output flow,
an actuator configured for opening and closing the valve, including partially opening the valve,
a regulator configured for controlling the actuator to open or close the valve or to partially open the valve,
wherein the regulator comprises a sense pressure port, wherein a pressure present at the sense pressure port is maintained constant by the regulator,
a chamber having a first entry orifice, a second entry orifice and an exit orifice, wherein the first entry orifice is connected to the valve upstream side, the second entry orifice is connected to the valve downstream side, and the exit orifice is connected to the sense pressure port, wherein the exit orifice is provided such that a pressure present at the exit orifice which is applied to the sense pressure port lies between a pressure at the first entry orifice and a pressure at the second entry orifice.

2. The valve assembly of claim 1, wherein the first entry orifice has a different size than the second entry orifice.

3. The valve assembly of claim 1, wherein the first entry orifice has a same size as the second entry orifice.

4. The valve assembly of claim 1, and further comprising an adjustment valve connecting the first entry orifice to the valve upstream side.

5. The valve assembly of claim 4, wherein the adjustment valve is configured to control the pressure at the first entry orifice.

6. The valve assembly of claim 4, wherein the adjustment valve is configured to limit a set upper value of the pressure at the first entry orifice.

7. The valve assembly of claim 6, wherein the adjustment valve is a pressure-relief valve that opens if the pressure at the first entry orifice exceeds the set upper value.

8. The valve assembly of claim 6, wherein the set upper value is set to be below a pressure at which the second entry orifice chokes during operation.

9. The valve assembly of claim 1, and further comprising at least one chosen from a first duct connecting the first entry orifice to the valve upstream side, a second duct connecting the second entry orifice to the valve downstream side and a third duct connecting the exit orifice is connected by a third duct to the sense pressure port.

10. The valve assembly of claim 1, wherein the actuator comprises a first chamber and a second chamber separated by an actuator diaphragm, the actuator diaphragm movable between the first chamber and the second chamber, wherein the regulator is configured to control a pressure of the first chamber, wherein the pressure of the first chamber determines an opening degree of the valve.

11. The valve assembly of claim 10, and further comprising an actuating lever and a rotating flap, the actuating lever coupling the second chamber to the rotating flap, wherein a position of the rotating flap controls the opening degree of the valve, wherein the position of the rotating flap is determined by the pressure of the first chamber.

12. The valve assembly of claim 10, wherein the regulator comprises a regulator first chamber, a regulator second chamber and a spring loaded diaphragm separating the regulator first chamber and the regulator second chamber, wherein the sense pressure port is coupled to the regulator first chamber, wherein the valve assembly is configured such that when the pressure at the sense pressure port is above a set pressure point, the pressure at the sense pressure port moves the spring loaded diaphragm against a force of the spring, thereby causing a valve to open which causes the first chamber of the actuator to depressurize.

13. The valve assembly of claim 10, and further comprising a solenoid assembly for switching the valve assembly on and off, wherein the solenoid assembly is configured to connect or disconnect the first chamber of the actuator to a high pressure source.

14. A gas turbine engine for an aircraft comprising:
an engine core comprising a turbine, a compressor, and a core shaft connecting the turbine to the compressor,
a nacelle having an intake lip,
an anti-ice system that provides bleed air from the compressor to the nacelle intake lip for heating the intake lip, and
a pressure regulating valve assembly which is configured to regulate an amount of bleed air provided to the intake lip, the pressure regulating valve assembly comprising:
a valve having an upstream side receiving an input flow and a downstream side providing an output flow,
an actuator configured for opening and closing the valve, including partially opening the valve,
a regulator configured for controlling the actuator to open or close the valve or to partially open the valve,
wherein the regulator comprises a sense pressure port, wherein a pressure present at the sense pressure port is maintained constant by the regulator,
a chamber having a first entry orifice, a second entry orifice and an exit orifice, wherein the first entry orifice is connected to the valve upstream side, the second entry orifice is connected to the valve downstream side, and the exit orifice is connected to the sense pressure port, wherein the exit orifice is provided such that a pressure present at the exit orifice which is applied to the sense pressure port lies between a pressure at the first entry orifice and a pressure at the second entry orifice.

15. The gas turbine engine of claim 14, and further comprising:

a fan located upstream of the engine core, the fan comprising a plurality of fan blades, a planetary gearbox that receives an input from the core shaft and outputs drive to the fan so as to drive the fan at a lower rotational speed than the core shaft.

\* \* \* \* \*